United States Patent Office 3,454,646
Patented July 8, 1969

3,454,646
POLYETHER AMINE OXIDE SURFACE-ACTIVE AGENTS
John T. Patton, Jr., Wyandotte, and Louis C. Pizzini, Trenton, Mich., assignors to Wyandotte Chemicals Corporation, Wyandotte, Mich., a corporation of Michigan
No Drawing. Filed Jan. 4, 1966, Ser. No. 518,540
Int. Cl. C07c 93/02, 93/00
U.S. Cl. 260—584      10 Claims

ABSTRACT OF THE DISCLOSURE

Polyether amine oxides and preparation by (1) reacting a polyoxyalkylene polyol with an epihalohydrin to form a polyoxyalkylene epihalohydrin adduct, (2) reacting the adduct with a secondary amine and a base to form a polyether-tertiary-amino compound, and (3) oxidizing the resulting tertiary-amino with hydrogen peroxide. These amine oxides are useful as surface active agents.

---

This invention relates to a new class of surface-active agents. In a more specific aspect, this invention relates to a class of polyether amine oxide surface-active agents, the members of which have been found to possess strikingly unique properties.

Amine oxides have long been known to have surface-active and germicidal properties. U.S. Patent No. 2,169,976 discloses a number of amine oxides and processes for their preparation. The patent further discloses that these compounds are useful generally as surface-active agents and that they may be used in combination with other surface-active agents such as sulphuric acid esters of aliphatic alcohols of high molecular weight and reaction products of fatty acids with hydroxyalkyl or aminoalkyl sulphonic acids.

The above prior art amine oxides are classified as nonionic surface-active agents and conform to the general formula $R_1R_2R_3N \rightarrow O$. $R_1$ is a $C_{8-18}$ alkyl or alkoxyalkyl radical. $R_2$ and $R_3$ are $C_{1-4}$ alkyl or hydroxyalkyl radicals, mono-nuclear aryl or aryylalkyl radicals or they are joined to form a heterocyclic radical.

Nonionic surface-active agents are composed of a water-insoluble or hydrophobic nucleus, such as a long hydrocarbon chain or an alkyl-substituted ring compound, such as nonylphenol, and a water solubilizing polyoxyethylene chain. The amine oxide radical results in more hydrophilicity than 10 ethoxyl groups and thus the prior art compounds have substituted the amine oxide radical in place of the polyoxyethylene chain. Such surface-active agents have excellent properties for many uses, but a disadvantage in these prior art amine oxide compounds lies in the inflexibility of the water-insoluble or hydrophobic portion of the molecule. Any alteration in properties attributable to the hydrophobic portion of the surfactant can only be accomplished by selecting a completely different water-insoluble compound with which to condense ethylene oxide or the amine oxide precursor. Frequently, however, different uses of surfactants require varying surfactant properties which differ only in small increments for the best performance.

Accordingly, an object of the present invention is to provide a new class of amine oxide surface-active agents having different structure and also different properties as compared to known amine oxides.

A specific object of this invention is to provide a new class of amine oxide surface-active agents which have the surprising ability to perform as polymeric flocculents.

A further object of this invention is to provide a new class of amine oxide surface-active agents having improved surface tension lowering properties and a high degree of compatibility with other active ingredients in detergent compositions.

Another object of this invention is to provide a new class of amine oxide surface-active agents having low foaming characteristics and a high degree of thermal stability.

A still further object of this invention is to provide a new class of amine oxide surface-active agents capable of imparting skin emolliency properties to detergent compositions and possessing emulsification and demulsification properties.

It was surprisingly discovered that these and other objects are achieved in a novel class of polyether amine oxide surface-active agents having the structure set forth below and in detergent compositions containing such compounds, as hereinafter more fully described. The general formula for the polyether amine oxide surface active compounds of this invention is:

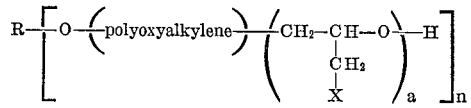

wherein (1) R is a saturated hydrocarbyl radical which together with attached oxygen is the residue of an alcohol having from one to six carbon atoms and from one to six hydroxyl groups; (2) $n$ is an integer from one to six, inclusive; (3) $a$ is from one to four, inclusive; (4) polyoxyalkylene represents a chain of oxyalkylene radicals, the total molecular weight of the polyoxyalkylene portion of the compounds being from about 1,000 to 20,000, said total molecular weight including the molecular weight of $R{+}O{-}{\}_n$, wherein R and $n$ are as defined above, said oxyalkylene radicals being selected from the group consisting of oxyalkylene radicals having from two to four, inclusive, carbon atoms and mixtures thereof, and said chain containing not more than about 50 weight percent of oxyethylene radicals; and (5) X is selected from the group consisting of chlorine, bromine, iodine, $R_1R_2N$, and $R_1R_2N \rightarrow O$, wherein at least one X in each compound is $R_1R_2N \rightarrow O$, and wherein $R_1$ and $R_2$ are alkyl or hydroxyalkyl radicals having from one to six carbon atoms, inclusive.

The polyether amine oxide surface-active agents of this invention have a total molecular weight of from about 1,100 to 28,000 with from about 10 to 90 weight percent of the total compound being the polyoxyalkylene portion thereof. An example of a compound of the invention is one which is prepared by condensing propylene oxide with propylene glycol to obtain a polyoxypropylene diol chain having a molecular weight of about 2,000, reacting at least a stoichiometric amount of an epihalohydrin with the polyoxypropylene diol to form a polyoxypropylene epihalohydrin adduct, reacting said adduct with a secondary amine and a base to form a polyether-tertiary-amino compound, and then oxidizing the resulting tertiary amino compound by reaction with hydrogen peroxide. This compound and the others encompassed by the general formula for the composition of the invention have certain unique and advantageous properties.

One such property is its surface tension lowering capabilities in water solution. The composition of the invention is a detergent itself and is compatible and effective in detergent formulations for washing fabrics.

Another unique property of the composition of the invention is that it has low foaming characteristics. This property is extremely advantageous for machine washing applications.

Still another unique property of the invention is its effectiveness as a polymeric flocculant. Flocculating agents are extremely valuable agents in the treatment of water and industrial and municipal wastes. They are used in the processing of sewage and the dewatering of sludge. Other uses, such as the coagulation of mineral slurries or dispersed organic materials, are possible.

Each of the particular steps that are followed in producing the composition of the invention can be carried out according to the procedures and under the conditions set forth below.

Initially, the lower molecular weight alcohol is condensed with a lower molecular weight alkylene oxide. The procedures, catalysts and conditions that are desirable for reacting an alkylene oxide, such as propylene oxide, with an alcohol, such as propylene glycol or trimethylolpropane, are known. Elevated temperatures and alkaline catalysts, such as sodium hydroxide or potassium hydroxide, are usually employed. Exemplary disclosures of the process and process conditions involved in this step are found in U.S. 2,677,700, U.S. 2,674,619, U.S. 3,036,118 and U.S. 3,036,130.

The second step involves the reaction of an epihalohydrin, such as epichlorohydrin, with the polyether alcoholalkylene oxide condensate. The condensate has a polyoxyalkylene chain terminating with a hydroxyl group attached to the alcohol at the site of each of the hydroxyl hydrogen atoms in the starting alcohol and a sufficient proportion of the epihalohydrin is generally used to insure that there is at least one mole of the epihalohydrin reacted with each of such terminal hydroxyl groups. It is sometimes desirable to use an excess of the epihalohydrin, especially where the polyether alcohol-alkylene oxide condensate is of high molecular weight and consequently possesses strong hydrophobic properties. Usually, up to about 4 moles of the epihalohydrin per hydroxyl can be used.

Condensing catalysts are usually used in reacting the epihalohydrin with the alcohol. Typical catalysts are those of the Friedel-Crafts type, including anhydrous aluminum chloride, boron trifluoride, zinc chloride, ferric chloride, stannic chloride, and complexes such as the well-known boron trifluoride etherates. Acid type catalysts can also be used including hydrofluoric acid, sulfuric acid and phosphoric acid. The concentration of the catalyst employed for the reaction of the epihalohydrin with the alcohol-alkylene oxide condensate can be varied, depending upon the individual catalyst. For example, from about 0.1 weight percent to about 0.2 weight percent of boron trifluoride or a complex thereof, based on the total weight of reactants, provides satisfactory results. In general, the condensing catalyst for the epihalohydrin reaction is used in small concentration, up to about 5 weight percent, and generally is less than one weight percent of the weight of the total reactants.

The temperature observed during the epihalohydrin reaction usually falls between about 25° C. and 175° C. In order to avoid color formation, we generally control the temperature within the range of about 50° C. to about 65° C. when using boron trifluoride-diethyl etherate or stannic chloride catalysts. Furthermore, it is customary when carrying out the epihalohydrin reaction to employ substantially dry reactants because water neutralizes or destroys the acid catalysts, especially a boron trifluoride complex catalyst.

The third step in the preparation of the composition of the invention consists in reacting the polyoxyalkylene-epihalohydrin adduct, prepared in step 2, with a secondary amine and a base to produce a polyether-tertiary-amino compound. This step can be carried out in either of two ways. The polyoxyalkylene epihalohydrin adduct can be reacted with a mixture of the secondary amine and base, or it can be reacted sequentially, first with the base and then with the amine. In the latter procedure, a dehydrohalogenation is accomplished by splitting off a hydrohalide acid in a known way to yield an epoxide which is then reacted with the secondary amine. An improved and preferred procedure is the former wherein a mixture of the base and secondary amine is used. The advantage of this method is that the intermediate epoxide compound does not have to be prepared and isolated prior to reaction with the secondary amine. The mechanism of this preferred reaction is not completely known, but it is believed that an epoxide compound is formed in situ which immediately reacts with secondary amine present to form the polyether-tertiary-amino compound. The reaction is usually carried out in an aqueous solution at temperatures in the range from about 50° C. to 110° C. and at atmospheric or elevated pressure, such as from about 0 to 100 p.s.i.g. Upon completion of the reaction which usually occurs in the range of from about 1 to 8 hours, the polyether-tertiary-amino compound so produced is filtered and stripped of excess unreacted secondary amine and water by heating at a temperature in the range of from about 100° C. to 150° C. and at a pressure of from about 0.1 to 10 mm. of mercury.

The polyether-tertiary-amino compound resulting from the reaction of the polyoxyalkylene epihalohydrin adduct with the secondary amine and base, when $a$ is one, has the general formula given below:

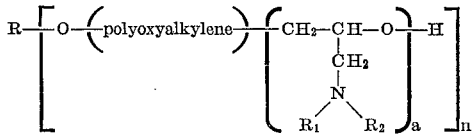

However, it is true that the polyoxyalkylene-epihalohydrin adduct may, on treatment with base and the secondary amine, produce a polyether-tertiary-amino compound having the structure.

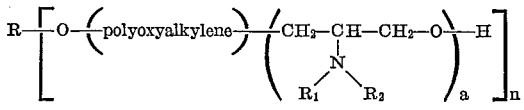

and in such event the polyether amine oxide compound of the invention that is made from such a polyether-tertiary-amino compound has the structure,

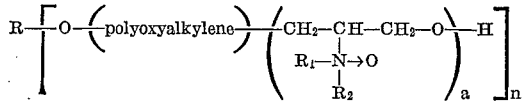

It is likely that a mixture of these isomeric compounds of the invention are produced and that only a minor percentage of the last described type is present in the product. It is also true that the polyoxyalkylene epichlorohydrin adduct prepared in step 2 can be present in two isomeric forms. Thus, it is possible that two additional isomeric polyether-tertiary-amino compounds and the corresponding polyether tertiary amine oxides produced therefrom could be present in minor percentages. The principal structure for the compound of the invention is that which was given first hereinabove and this structure in the specification stands for all types of isomers and mixtures of these isomers.

The fourth and final step in the preparation of the composition of the invention consists in oxidizing the polyether-tertiary-amino compound. The reaction with the oxidizing agent, such as hydrogen peroxide, is carried out in aqueous solution or suspension at ordinary or elevated pressure and at a temperature in the range of from about 40° to 90° C., preferably 65° to 75° C. The polyether-tertiary-amino compound is preheated to a temperature in the range of from about 40° to 80° C., preferably 55° to 65° C., and approximately 20 to 35 percent by weight aqueous solution of the oxidizing agent is added thereto. The addition of the oxidizing agent is made slowly, with good mixing, over a period of time from about ½ to 2 hours. Fluidity of the reaction mixture is maintained by the addition of water whenever it is required. Upon completion of the above addition of oxidizing agent, the temperature of the reaction mixture is raised to about 65° to 75° C. and maintained at that level for about 1 to 10 hours. Completion of the reaction is signified by the reaction mixture obtaining a pH value of approximately pH 7.0. A convenient method for determining the completion of reaction and also measuring the pH level is by continuing the reaction until a negative phenolphthalein spot test is produced.

The alcohols that can be used in the first step of the process for producing the composition of the invention are alcohols having up to about 6, inclusive, carbon atoms and having from about 1 to 6, inclusive, hydroxyl groups. These alcohols include monohydroxy aliphatic alcohols, such as methanol, propanol, butanol, hexanol, as well as phenol, cyclohexanol and the like, glycols, such as ethylene glycol, propylene glycol, butylene glycol, and the like, polyoxyalkylene glycols, such as diethylene glycol, dipropylene glycol and triethylene glycol, alkyl ethers of glycols, such as methyl ether of ethylene glycol, ethyl ether of propylene glycol, butyl ether of ethylene glycol, aliphatic polyols, such as trimethylolethane, trimethylolpropane, pentaerythritol, glycerol, 1,5-pentanediol, 1,2,6-hexanetriol and mono- or dialkyl ethers of aliphatic triols and mono-, di- or trialkyl ethers of tetrols. Mixtures of such alcohols can also be used. The starting alcohol does not have a large influence on the properties of the final polyether amine oxide composition of the invention and any alcohol falling within the definitions given above can be used.

The alkylene oxides that are used in the first step of the process for producing the composition of the invention are the lower alkylene oxides, those having from 2 to 4, inclusive, carbon atoms. These include ethylene oxide, propylene oxide, butylene oxide, including its various isomers, and methyl glycide. The alcohol-alkylene oxide condensate that is produced in the first step of the process for producing the composition of the invention provides the hydrophobic portion of the anionic surface active composition of the invention. Therefore, there is an upper limit on the proportion of ethylene oxide that can be used in the reaction between the alcohol and the alkylene oxide. Generally, ethylene oxide can be used only in admixture with one of the other alkylene oxides that has been disclosed. When ethylene oxide is used together with propylene oxide, the amount of ethylene oxide used should not exceed about 50 weight percent of the weight of propylene oxide that is used. When ethylene oxide is used in conjunction with butylene oxide or methyl glycide, the proportion of ethylene oxide can be as high as about 70 weight percent. Of course, all kinds of mixtures of these alkylene oxides can be used. Such mixtures of ethylene oxide, propylene oxide and butylene oxide can be used. When the term "mixtures" is employed, the term is intended to include mixtures produced by the sequential reaction of first one alkylene oxide and then another or first one mixture of alkylene oxides and then another which tends to produce blocks or chains of oxyalkylene groups corresponding to the alkylene oxide that is used in each step or sequence. The result of condensing an alkylene oxide or alkylene oxide mixture with an alcohol is known to produce a mixture of products of varying molecular weight. Such mixtures are referred to as cogeneric mixtures and the molecular weight is the theoretical average molecular weight of such a mixture.

The alcohol-alkylene oxide condensate that results from the reaction with the alcohol should have a molecular weight in the range of about 1000 to 20,000. The molecular weight range must take into consideration the number of hydroxyl groups in the starting alcohol, however, and where there are two such hydroxyl groups, for example, the molecular weight range includes the molecular weight of both oxyalkylene chains that are formed.

Wherever molecular weights are indicated in this specification, and unless otherwise specifically noted, the theoretical molecular weight is meant.

Products made using propylene oxide are specially preferred and such a product made from propylene glycol and propylene oxide in which the molecular weight of the glycol-propylene oxide condensate is in the range of about 1500–2500 is the preferred species of the composition of the invention.

The epihalohydrins that are used in the second step of the process for producing the composition of the invention include epichlorohydrin, epibromohydrin and epiiodohydrin. The latter epihalohydrins are characterized by a three-carbon chain. Epifluorohydrin and its analogues are not included within the term "epihalohydrin" in this specification. In view of its ready availability and low cost, epichlorohydrin is the preferred epihalohydrin for use.

The amines that are used in the third step of the process for producing the composition of the invention are secondary amines. The secondary amines included are dialkylamines such as dimethylamine and diisopropylamine; alkanolamines such as diethanolamine and methylethanolamine; and diamines such as N,N'-dimethylethylene diamine.

The oxidizing agents useful in the final step for converting the polyether-tertiary-amino compounds to the corresponding polyether amine oxide composition of the invention include compounds such as hydrogen peroxide, sodium peroxide, permonosulfuric acid, peracetic acid and perbenzoic acid. Aqueous solutions of 20 percent to 35 percent by weight hydrogen peroxide are especially preferred.

The following examples are provided in order to illustrate the composition of the invention. All percentages given herein are percentages by weight unless otherwise indicated. These examples should not be employed to unduly restrict the scope of this invention.

EXAMPLE I

Part A.—Preparation of the polyoxyalkylene epichlorohydrin adduct

To a 3-liter, 4-necked flask equipped with a stirrer, thermometer, addition funnel, nitrogen bubbler and reflux condenser was added 1975 grams of polypropylene glycol (Pluracol P 2010, molecular weight of 1975) and 3.90 grams of $BF_3$- diethyl ether catalyst. The polyether polyol-acid mixture was heated to 55° C. under nitrogen with stirring and 222 grams (2.40 moles) of epichlorohydrin was added over 2.5 hours at about 55° C. The reaction was exothermic. After the addition was completed, the reaction mixture was maintained at 55° C. for 1.5 hours. Essentially all of the epichlorohydrin reacted. The polyoxyalkylene epichlorohydrin adduct so produced was a clear, light-amber liquid.

Part B.—Preparation of the polyether-tertiary-amino compound

A mixture of 725 grams of the polyoxyalkylene epichlorohydrin adduct prepared in part A above (0.33 mole), 108 grams of a 40% aqueous solution of dimethylamine (0.96 mole) and 53 grams of a 50% aqueous solution of sodium hydroxide (0.66 mole) were heated for 3 hours at 100° C. and about 20 p.s.i.g. in an autoclave. The reaction product was filtered using a Celite mat, stripped at 120° C. for 1 hour at a pressure of 2 to 3 mm. of mercury to remove unreacted dimethylamine and water, and filtered to give a slightly hazy, yellow-brown liquid which had a weak, amine odor and a pH of 9. This material was insoluble in water but readily soluble in dilute aqueous hydrochloric acid. The aqueous solution of the polyether amine-hydrochloride foamed highly on shaking indicating that this material was surface-active.

Part C.—Preparation of the polyether amine oxide surface-active agent

To a 2-liter, 4-necked flask equipped with a stirrer, thermometer, addition funnel, and reflux condenser was added 443 grams (0.20 mole) of the polyether-tertiary-amino compound prepared in part B, above. The polyether-tertiary-amino compound was heated to about 60° C. and 54.5 grams of a 30% aqueous solution of hydrogen peroxide (0.48 mole) was added over 1 hour at 60° C. After a 6-hour reaction period at 60–70° C., the pH of the reaction mixture was 7, indicating conversion of the tertiary amine to the amine oxide. The starting polyether-tertiary-amino compound had a pH of 9. The reaction mixture was then maintained at about 70° C. for an additional 6 hours. The aqueous reaction mixture, having a 90% concentration as amine oxide based on 100% conversion of the amine to the amine oxide, was a clear, yellow, viscous liquid having a pH of 7. The properties of the polyether amine oxide surface-active agent thus prepared, which had a molecular weight of 2246 are presented in Tables 1, 2 and 3, below.

EXAMPLE II

A polyether amine oxide surface-active agent of this invention was prepared as follows:

Part A

A polyoxyalkylene epichlorohydrin adduct was prepared by reacting 1935 grams (1.0 mole) of polypropylene glycol, Pluracol P 2010 (molecular weight of 1972) and 222 grams (2.4 moles) of epichlorohydrin in the presence of 3.75 grams of $BF_3$-diethyl ether catalyst. 1078.5 grams (0.5 mole) of the polyoxyalkylene epichlorohydrin adduct was reacted with 96 grams (1.2 mole) of a 50% aqueous solution of sodium hydroxide to produce the diglycidyl ether of the polyoxyalkylene polyol.

Part B

The polyether-tertiary-amino compound was prepared by reacting 136 grams (0.06 mole) of the diglycidyl ether of the polyoxyalkylene polyol prepared in part A above with 29 grams (0.26 mole) of a 40% aqueous solution of dimethylamine. The polyether-tertiary-amino compound was insoluble in water and had a pH of 9.

Part C

The polyether amine oxide surface active agent was prepared by reacting 143 grams (0.065 mole) of the polyether-tertiary-amino compound prepared in part B above with 17.7 grams (0.16 mole) of a 30% aqueous solution of hydrogen peroxide.

The properties of the polyether amine oxide surface-active agent thus prepared, which had a molecular weight of 2186 and a pH of 7, are presented in Tables 1, 2, and 3, below.

EXAMPLE III

A polyether amine oxide surface-active agent of this invention was prepared according to the procedure of Example I as follows:

Part A

The polyoxyalkylene epichlorohydrin adduct in part A was prepared by reacting 1975 grams (1.0 mole) of polypropylene glycol, Pluacol P 2010 (molecular weight of 1975) and 222 grams (2.40 moles) of epichlorohydrin in the presence of 3.90 grams of $BF_3$-diethyl ether catalyst.

Part B

The polyether-tertiary-amino compound was prepared by reacting 549 grams (0.25 mole) of polyoxyalkylene epichlorohydrin adduct prepared in part A above with 131 grams of a 40% aqueous solution of diethanol amine (0.50 mole) and 40 grams (0.50 mole) of a 50% aqueous solution of sodium hydroxide.

Part C

The polyether amine oxide surface-active agent was prepared by reacting 304 grams (0.13 mole) of the polyether-tertiary-amino compound prepared in part B above with 32.4 grams (0.29 mole) of a 30% aqueous solution of hydrogen peroxide.

The properties of the polyether amine oxide surface-active agent thus prepared, which has a molecular weight of 2366, are presented in Tables 1, 2, and 3, below.

EXAMPLE IV

A polyether amine oxide surface-active agent of this invention was prepared according to the procedure of Example I as follows:

Part A

The polyoxyalkylene epichlorohydrin adduct in part A was prepared by reacting 1050 grams (1.0 mole) of polypropylene glycol, Pluracol P 1010 (molecular weight of 1050) and 222 grams (2.4 moles) of epichlorohydrin in the presence of 3.90 grams of $BF_3$-diethyl ether catalyst.

Part B

The polyether-tertiary-amino compound was prepared by reacting 1272 grams (1.0 mole) of the polyoxyalkylene epichlorohydrin adduct prepared in part A above with 248 grams of a 40% aqueous solution of dimethyl amine (2.2 moles) and 160 grams (2.0 moles) of a 50% aqueous solution of sodium hydroxide.

Part C

The polyether-amine-oxide surface-active agent was prepared by reacting 515 grams (0.40 mole) of the polyether-tertiary-amino compound prepared in part B above with 100 grams (0.88 mole) of a 30% aqueous solution of hydrogen peroxide.

The properties of the polyether amine oxide surface-active agent thus prepared, which has a molecular weight of 2246, are presented in Tables 1, 2, and 3, below.

EXAMPLE V

A polyether amine oxide surface-active agent of this invention was prepared according to the procedure of Example I as follows:

Part A

The polyoxyalkylene epichlorohydrin adduct in part A was prepared by reacting 300 grams (0.1 mole) of glycerol mixed polyoxypropylene-polyoxyethylene polyol (weight ratio of oxypropylene to oxyethylene of 9:1 and a molecular weight of 3000) and 41.6 grams (0.45 mole) of epichlorohydrin in the presence of 0.585 gram of $BF_3$-diethyl ether catalyst.

Part B

The polyether-tertiary-amino compound was prepared by reacting 341.6 grams (0.1 mole) of the polyoxyalkylene epichlorohydrin adduct prepared in part A above with 65.75 grams of a 40% aqueous solution of diethyl amine (0.36 mole) and 24 grams (0.3 mole) of a 50% aqueous solution of sodium hydroxide.

Part C

The polyether amine oxide surface-active agent was prepared by reacting 352.5 grams (0.1 mole) of the polyether-tertiary-amino compound prepared in part B above with 20.4 grams (0.18 mole) of a 30% aqueous solution of hydrogen peroxide.

The properties of the polyether amine oxide surface active agent thus prepared, which has a molecular weight of 3550, are presented in Tables 1 and 3, below.

EXAMPLE VI

A polyether amine oxide surface-active agent of this invention is prepared according to the procedure of Example I as follows:

Part A

The polyoxyalkylene epichlorohydrin adduct in part A is prepared by reacting 610 grams (0.1 mole) of sorbitol polyoxypropylene polyol (molecular weight of 6100) and 61 grams (0.66 mole) of epichlorohydrin in the presence of 1.17 gram of $BF_3$-diethyl ether catalyst.

Part B

The polyether-tertiary-amino compound is prepared by reacting 671 grams (0.1 mole) of the polyoxyalkylene epichlorohydrin adduct prepared in part A above with 169.8 grams of a 40% aqueous solution of N-methyl cyclohexyl amine (0.6 mole) and 48.0 grams (0.6 mole) of a 50% aqueous solution of sodium hydroxide.

Part C

The polyether amine oxide surface-active agent is prepared by reacting 716.9 grams (0.1 mole) of the polyether-tertiary-amino compound prepared in part B above with 81.8 grams (0.72 mole) of a 30% aqueous solution of hydrogen peroxide.

The properties of the polyether amine oxide surface-active agent thus prepared, which has a molecular weight of 7268, are similar to those presented in Tables 1, 2 and 3, below.

TABLE 1

| | Examples | | | | |
|---|---|---|---|---|---|
| | 1 | 2 | 3 | 4 | 5 |
| Cloud point, °C | 4 | | 5 | 17 | |
| Dynamic foam height [1] in mm. at 10 minutes | 15 | | 10 | 25 | |
| Color | (3) | (3) | (3) | (3) | (3) |
| Solution activity, percent | 90 | 89 | 91 | 86 | 91 |
| Solubility 1./l. in water | (4) | (4) | (4) | (4) | (4) |
| pH | 7 | 7 | 7 | 7 | 7 |
| 0.1% solution at 25° C.: | | | | | |
| (a) color | (5) | (5) | (5) | (5) | (5) |
| (b) odor | (6) | (6) | (6) | (6) | (6) |
| (c) clarity | (7) | (7) | (7) | (7) | (7) |
| (d) pH | 5.8 | 5.2 | 5.0 | 5.5 | |
| (e) Surface tension dynes/cm.[2] | 35.6 | 33.5 | 34.1 | 35.7 | |
| Draves Test [2]: | | | | | |
| (a) Sink time in seconds | 72.3 | 155.2 | 73.2 | 200.6 | |
| (b) 25-second sink time, g./l. | >1 | >1 | >1 | >1 | |

[1] This procedure and a description of the equipment used is described in Soap and Chemical Specialties, April 1961.
[2] Draves sink time procedure is described in AATCC Tentative Test Method 17-52.
[3] Yellow.
[4] Clear.
[5] Colorless.
[6] Odorless.
[7] Cloudy.

TABLE 2

| | | Examples | | | |
|---|---|---|---|---|---|
| | Standard [1] | 1 | 2 | 3 | 4 |
| Tagged clay soil detergency test [2]: | | | | | |
| (a) Soil removal | 100 | 99 | 93 | 88 | 100 |
| (b) Whiteness retention | 100 | 49 | 29 | 41 | 44 |

[1] Standard commercial high titer soap, 92% active agent.
[2] ASTM publication, Special Technical Publication No. 268 (1959), pp. 27-39.

The polyether amine oxide compounds of this invention are surface-active agents. Table 1 above, demonstrates some of the desirable properties of these compositions. Thus, as noted by the values for surface tension, the polyether amine oxides of this invention are surface-active. They are classified as low foamers as seen by the foam height values of from only 10 to 25 mm. The desirability of low foaming surface-active agents has been well demonstrated, such as in machine washing applications. The pH values of these compositions are a pH of approximately 7 and aqueous, 0.1% solutions, are only slightly acidic. This makes the polyether amine oxide compositions of this invention desirable for built detergent compositions due to their handling characteristics.

When the compositions were evaluated by the tagged clay soil detergency test in a built formulation comprising 40% by weight polyether amine oxide, 50% by weight sodium tripolyphosphate, and 10% by weight sodium metasilicate, anhydrous, they exhibited good detergency values as indicated in Table 2 above. This test employs cotton cloth soiled with a combination of oil and a radioactive tagged clay, preparation of which has been described in an ASTM publication [Special Technical Publication No. 268 (1959), pp. 27-39]. Use of the radioactive tag permits accurate measurements at the low soil levels found in practice. Washing is done with a special small-scale machine which has been found to give soil removal results similar to those obtained with a domestic washing machine. The soiled cloth is washed along with clean cloth. The soiled cloth's loss in radioactivity gives a measure of soil removal, while the gain in radioactivity by the clean cloth gives a measure of soil redeposition. Results are stated as a percent of those obtained with a standard unbuilt soap used at 0.25% in demineralized water. The amine oxide compounds have been found to be compatible with other detergent ingredients. The polyether amine oxide surface-active agents of this invention are thus well adapted for use in built detergency formulations.

The ability of the polyether amine oxide surface-active agent of this invention to operate as a polymeric flocculent, which ability is not possessed by the prior art amine oxide surfactants, is demonstrated by comparing the action of a commercially available amine oxide standard, dimethylcocoamine oxide (Armox DMCD) with that of the polyether amine oxides of Examples I, II, and V. Table 3, below, shows the results of the addition of 0.1 gram portions of the standard dimethylcocoamine oxide, Example I, Example II, and Example V, to the following suspensions:

(A) 1 g./l. and 10 g./l. of carbon (activated carbon, Grade G-60, Atlas) in distilled water;

(B) 1 g./l. and 10 g./l. of talc (J. T. Baker, U. S. P.) in distilled water; and (C) 1 g./l. and 10 g./l. of Douglas Pearl Starch (Penick and Ford).

TABLE 3

| | | Examples | | |
|---|---|---|---|---|
| | Standard [1] | 1 | 2 | 5 |
| Flocculation carbon: | | | | |
| (a) 1 g./l. in $H_2O$ | − | + | + | + |
| (b) 10 g./l. in $H_2O$ | − | + | + | + |
| Talc: | | | | |
| 1 g./l. in $H_2O$ | − | + | + | + |
| 10 g./l. in $H_2O$ | − | + | + | + |
| Starch: | | | | |
| 1 g./l. in $H_2O$ | − | + | + | + |
| 10 g./l. in $H_2O$ | − | + | + | + |

− Flocculation did not occur.
+ Flocculation is essentially immediate.
[1] Standard composition of dimethylcocoamine oxide (Aromox DMCD).

As seen in Table 3 above, the flocculation produced by the polyether amine oxide product of this invention is essentially immediate, whereas, the prior art amine oxide product produced no flocculation at all. The fact that polymeric flocculants are extremely valuable agents has been demonstrated by their recent usage in the treatment of water, industrial and municipal wastes, and sewage. Other uses, such as coagulation of mineral ore slurries and the like, will be apparent.

What is claimed is:

1. A nonionic surface-active cogeneric mixture of polyether amine oxide compounds having a molecular weight of from about 1100 to 28,000 and the formula:

$$R - \left[ O - \left( \text{polyoxyalkylene} \right) - \left( CH_2-CH-O \atop {\underset{X}{\overset{|}{CH_2}}} \right)_a \right]_n H$$

wherein
(1) R is a saturated hydrocarbyl radical having from one to six, inclusive, carbon atoms;
(2) n is an integer from one to six, inclusive;
(3) a is from one to four, inclusive;
(4) polyoxyalkylene represents a chain of oxyalkylene radicals, said oxyalkylene radicals being selected from the group consisting of oxyalkylene radicals having from two to four, inclusive, carbon atoms and mixtures thereof, said chain containing not more than about 50 weight percent of oxyethylene radicals, and the total polyoxyalkylene content being from about 10–90 weight percent of said compounds; and (5) X is selected from the group consisting of chlorine, bromine, iodine, $R_1R_2N$, and $R_1R_2N \rightarrow O$, wherein at least one X in each compound is $R_1R_2N \rightarrow O$, and wherein $R_1$ and $R_2$ are alkyl or hydroxyalkyl radicals having from one to six carbon atoms, inclusive.

2. A nonionic surface-active mixture of polyether amine oxide compounds according to claim 1 wherein polyoxyalkylene represents a chain of oxypropylene radicals.

3. A nonionic surface-active mixture of polyether amine oxide compounds according to claim 1 wherein polyoxyalkylene represents a chain consisting of a mixture of oxypropylene and oxyethylene radicals.

4. A nonionic surface-active mixture of polyether amine oxide compounds according to claim 1 wherein polyoxyalkylene represents a chain consisting of a mixture of oxybutylene and oxyethylene radicals.

5. A nonionic surface-active mixture of polyether amine oxide compounds according to claim 1 wherein polyoxyalkylene represents a chain consisting of a mixture of oxypropylene and oxybutylene radicals.

6. A nonionic surface-active mixture of polyether amine oxide compounds according to claim 1 wherein polyoxyalkylene represents a chain of oxybutylene radicals.

7. A nonionic surface-active mixture of polyether amine oxide compounds according to claim 1 wherein R represents propylene glycol with its hydroxyl groups removed therefrom, $n$ equals 2, polyoxyalkylene represents a chain of oxypropylene radicals; $R_1$ and $R_2$ are methyl radicals.

8. A nonionic surface-active mixture of polyether amine oxide compounds according to claim 7 wherein $R_1$ and $R_2$ are ethanol radicals.

9. A nonionic surface-active mixture of polyether amine oxide compounds according to claim 1 wherein R represents sorbitol with its hydroxyl groups removed therefrom, $n$ equals 6, polyoxyalkylene represents a chain of oxypropylene radicals, $R_1$ is a methyl radical; and $R_2$ is a cyclohexyl radical.

10. A nonionic surface-active mixture of polyether amine oxide compounds according to claim 1 wherein R represents glycerol with its hydroxyl groups removed therefrom, $n$ equals 3, polyoxyalkylene represents a chain consisting of a mixture of oxypropylene and oxyethylene radicals; and $R_1$ and $R_2$ are ethyl radicals.

References Cited

UNITED STATES PATENTS 3,206,512  9/1965  Koebner et al.

FOREIGN PATENTS 1,418,653  10/1965  France.

CHARLES B. PARKER, *Primary Examiner.*

R. L. RAYMOND, *Assistant Examiner.*

U.S. Cl. X.R.

167—22; 252—357